Aug. 11, 1942.  F. D. LEVERING  2,292,764
FLOW CONTROL MECHANISM
Filed March 3, 1941

INVENTOR
FLOYD D. LEVERING
BY
ATTORNEYS

Patented Aug. 11, 1942

2,292,764

UNITED STATES PATENT OFFICE 2,292,764

FLOW CONTROL MECHANISM

Floyd D. Levering, Detroit, Mich.

Application March 3, 1941, Serial No. 381,533

3 Claims. (Cl. 137—9)

This invention relates to automatic control devices for liquids flowing in pipes and other conducting systems, and particularly to improved means for diverting and controlling the flow of rain water in a rain water collecting system consisting, for example, of a cistern and appropriate conductors leading thereto. An important object of the invention is to provide improved means whereby the roofs, gutters and other parts of the system may be automatically flushed and cleaned at the commencement of each substantial rainfall, while the water which carries the dirt thus washed down is diverted, and prevented from reaching the cistern. The cistern accordingly collects only clean water.

I am aware that various types of apparatus intended to accomplish the general object outlined above have been developed in the past, and that some of these have employed float-operated diverter valves to divert the wash-down water, as does my improved system, but such previously known arrangements have met with little commercial success and failed of general adoption, particularly because of the difficulties encountered with clogging of the float mechanism, float chamber, and bleeder opening of the latter, where a bleeder opening was employed. All of these parts, since they were forced to receive the dirt washed from the collecting system, were subject to unavoidable clogging, and soon became inoperative.

This was particularly true of those systems in which a bleeder opening was provided in the float chamber for the purpose of allowing water to leak out of the float chamber after the cessation of the rainfall. The inevitable clogging of such openings rendered the apparatus inoperative. It was further necessary, in such prior art devices, to utilize relatively large, and therefore expensive, float mechanisms, and to maintain the float elevated during a rainfall by constantly bypassing a quantity of the rain water to the float chamber, during normal flow to the cistern.

With my improved apparatus the float chamber is not only smaller and less expensive than those previously known, in apparatus of this general character, but is provided with a large outlet, instead of a restricted bleeder, so that the float chamber is self-flushing at each substantial rainfall, and the danger of clogging is therefore virtually eliminated while, in addition, the float chamber cannot accumulate water, and so cause the rain water to be directed to the cistern due to filling of the chamber under the slow accumulation of a number of light rains or dews.

Novel means is incorporated whereby advantage is taken of the kinetic energy of the flowing water moving down the conductor pipes, to maintain the valve in the position in which it directs water to the cistern, after it has been tripped to that position. The valve is thus maintained in this position so long as the rainfall continues at a substantial rate, and none of the clean water is wasted in maintaining the level in the float chamber, as in previously known systems. The float chamber and the entire collecting system are flushed by the first substantial rainfall, and the first filling of the float chamber to a predetermined level is sufficient to trip the valve to the position in which it directs the water to the cistern. The valve is thereafter maintained in that position by the force of the flowing water, so long as any material flow continues.

Other objects and advantages will be apparent from the following description, wherein reference is made to the accompanying drawing illustrating a preferred embodiment of my invention and wherein similar reference numerals designate similar parts throughout the several views.

Figure 1:
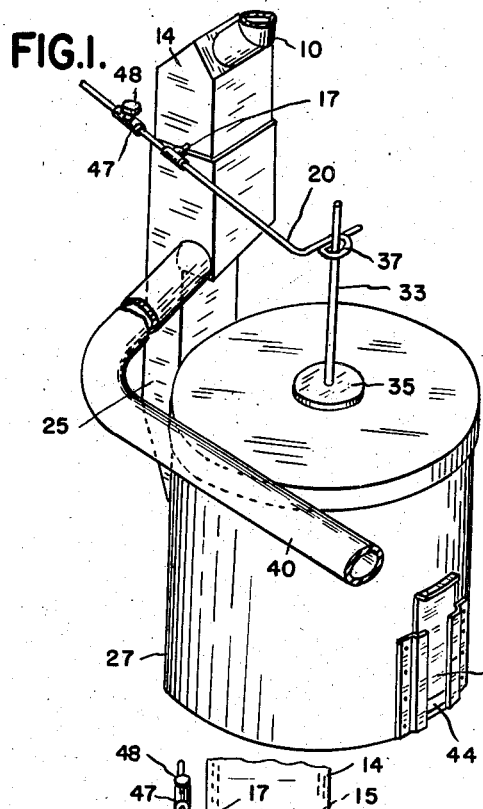
Figure 1 is a perspective view of a flow control mechanism incorporating the principles of the present invention.

Referring now to the drawing, reference character 10 designates a down-spout, illustrated as a typical source of rain water. 12 represents a cistern in which it is desired to collect the cleaner portion of the water flowing down the down-spout, which may be assumed to receive the water from a roof. The down-spout leads into a valve box 14, which may be formed of sheet metal. The valve box is of rectangular cross section, and preferably disposed substantially vertically, but arranged on one side of the down-spout, so that the latter discharges thereinto angularly, as shown. A valve 15, also formed of sheet metal, is pivoted in the valve box upon a cross shaft 17, and projects upwardly in such manner that when thrown to either side of the box it lies in an angular position and directs water to the opposite side. A vertical partition 26 meets the lower end of the valve and from one of the sections thus defined a leader 40 runs to the cistern 12, while the other section discharges into the float chamber 27 through a conductor section 25.

Figure 2:
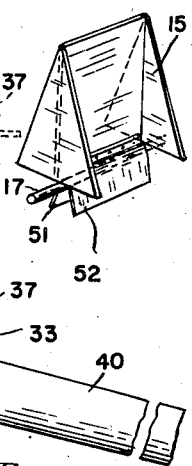
Figure 2 is a view partly in vertical section and partly in side elevation.

A arm 20 fixed to the shaft 17 outside the box is so proportioned and weighted that it normally maintains the valve in the position shown in full lines in Figure 2, in which position the water from the down-spout 10 is directed to the float chamber. The hollow float 30, which is adapted to rise and fall in the chamber 27 with the level of the water therein, is provided with a stem or rod 33 projecting vertically from the top of the chamber, and carrying an abutment disc 35. The float rod 33 extends freely through the top of the casing and through the opening 37 in the end of the arm 20. It will be seen that when the float rises sufficiently, the disc 35, striking the arm 20, throws the valve to the position shown in dotted lines in Figure 2, in which latter position the water is directed, through conductor 40, to the cistern 12.

The float chamber is provided at its bottom with an opening 44 of substantial size, controlled by an adjustable gate 45. The orifice 44, for each installation of the apparatus, is adjusted to such size, by means of the gate, that the float chamber cannot be filled sufficiently to trip the valve unless the water flow exceeds a predetermined volume within a given time. Thus the first rainfall, which contains whatever dirt and foreign matter may be washed from the roof, is directed into the float chamber, through which the dirt passes freely with the water, by reason of the large size of the orifice 44, whence it may be discharged into the sewer, upon the ground, or in any desired manner.

When the valve is tripped to the dotted line position of Figure 2, the continuing flow through the downspout 10 and its angular section 10', being directed against the valve, as indicated by the arrow 11, maintains the valve in that position, regardless of the water level in the valve chamber, until the flow ceases, or is reduced below a predetermined minimum. The rate of flow required to maintain the valve in this position is adjustable by means of a counterweight 47, slidable along the arm 20, and adapted to be fixed thereupon by means of the thumb screw 48. It will be understood that this counterweight is insufficient to maintain the valve in this position, however, after cessation of the flow in the downspout, at which time the valve is returned to the position shown in full lines in Figure 2, and the mechanism is thus ready to divert the first portion of the next succeeding rainfall to the float chamber as before.

Figure 5:
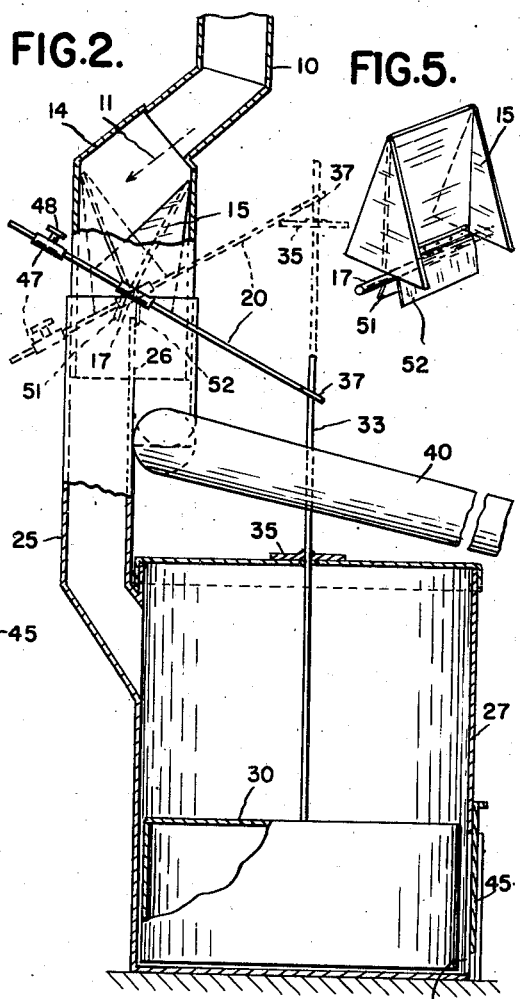
Figure 5 is a perspective view of the valve assembly removed from the casing.
Figure 3:
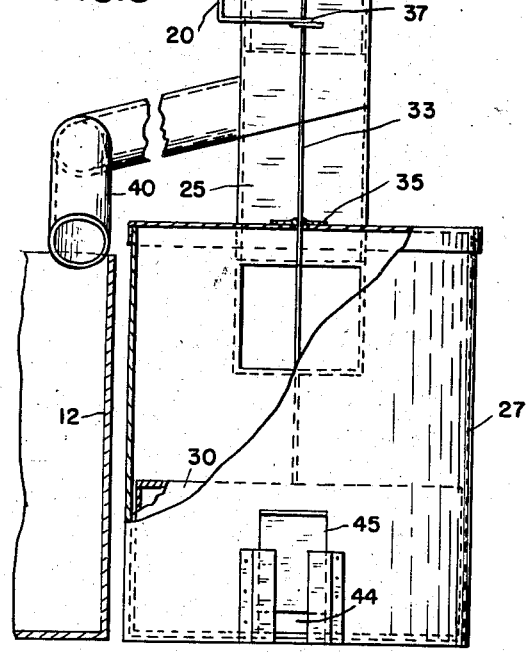
Figure 3 is a front elevation, partly broken away.
Figure 4:
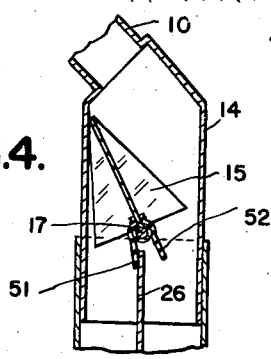
Figure 4 is a fragmentary vertical sectional detail of the valve mechanism, looking in a direction opposite to that in which the parts are viewed in Figure 2.

As best shown in Figures 4 and 5, the valve consists of a flat sheet metal member or vane extending across the valve box and provided with sheet metal sides serving as guards to restrict the tendency of water to leak around the sides of the valve. This is of course not essential, but provides for more complete utilization of all of the rainwater. Sealing strips as 51, 52, are also preferably provided, secured to and extending along the lower edge of the valve, one being adapted to engage the upper end of the partition 26 in each position of the valve. The sealing strips may be formed of soft rubber, and further insure the diversion of substantially all of the water in the desired direction.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

What I claim is:

1. Flow controlling means comprising in combination with a source of flowing liquid, a float chamber having an inlet, and having an outlet smaller than the inlet but of substantial size, a float in said chamber, an unbalanced diverter valve arranged between the source and the float chamber and biased to stand normally in a diverting position in which it directs liquid to said float chamber, through said inlet, said valve having a one-directional driving connection with said float whereby the float is operable by the valve to a delivery position in response to a predetermined rise of liquid level in said chember, but said valve cannot be returned to the diverting position by the float, the liquid being directed away from said float chamber when the valve is in the delivery position, and means for directing the controlled liquid against said valve, when the valve is in the delivery position, in a direction to maintain the valve in said delivery position while the flow from said source is maintained at a predetermined rate.

2. Flow controlling means for liquids, comprising in combination with a source of liquid a float chamber having an outlet of substantial size, a float in said chamber, an unbalanced diverter valve biased to stand normally in a diverting position, said valve having a lost motion one-directional driving connection with said float whereby the valve is operable by the float to a delivery position, in response to a predetermined rise of liquid level in said chamber, said valve being arranged in a valve chamber located between the source and the float chamber and means comprising an inlet opening into said valve chamber in a direction to project the liquid against said valve in a direction to maintain the valve in said delivery position.

3. Flow controlling means comprising in combination with a source of flowing liquid, a float chamber having an inlet, and having an outlet smaller than the inlet but of substantial size, a float in said chamber, a diverter valve arranged between the source and the float chamber and biased to stand normally in one position in which it directs liquid to said float chamber, through said inlet, one-directional driving means connecting the float to the valve whereby said valve is operable by the float to a second position in which the liquid is directed away from said float chamber, but the valve cannot be returned to the first mentioned position by the float, and means for applying at least a part of the energy of the liquid flowing fom said source to the valve when the valve is in said second position to maintain the valve in said second position while a predetermined flow from said source is maintained.

FLOYD D. LEVERING.